United States Patent
Monti

(10) Patent No.: US 6,971,216 B2
(45) Date of Patent: Dec. 6, 2005

(54) DEVICE FOR SINGLING OUT ITEMS COMING FROM A FEEDER

(75) Inventor: Giuseppe Monti, Bologna (IT)

(73) Assignee: Marchesini Group S.p.A., Pian di Macina-Pianoro (IT)

(*) Notice: Subject to any disclaimer, the term of this patent is extended or adjusted under 35 U.S.C. 154(b) by 0 days.

(21) Appl. No.: 10/736,764

(22) Filed: Dec. 16, 2003

(65) Prior Publication Data

US 2004/0139695 A1    Jul. 22, 2004

(30) Foreign Application Priority Data

Dec. 17, 2002   (IT)   ............ BO2002A0793

(51) Int. Cl.[7] ............................................. B67B 3/00
(52) U.S. Cl. ....................... 53/310; 53/304; 53/319
(58) Field of Search .................... 53/310, 311, 312, 53/264, 292, 304, 319, 322

(56) References Cited

U.S. PATENT DOCUMENTS

| | | | | |
|---|---|---|---|---|
| 2,167,895 A | * | 8/1939 | Kotcher | ............ 53/319 |
| 3,141,278 A | * | 7/1964 | Kazmier | ............ 53/319 |
| 3,170,231 A | * | 2/1965 | Gleason | ............ 29/715 |
| 3,432,989 A | * | 3/1969 | Bouzereau | ............ 53/264 |
| 4,309,820 A | | 1/1982 | Schindel | |
| 4,716,708 A | * | 1/1988 | Ochs | ............ 53/314 |
| 4,996,820 A | * | 3/1991 | Harrison, Jr. | ............ 53/69 |
| 6,393,800 B1 | * | 5/2002 | Schwenke | ............ 53/329 |
| 6,578,614 B1 | * | 6/2003 | Loewenthal | ............ 156/358 |

FOREIGN PATENT DOCUMENTS

FR        1426652 A        4/1966

* cited by examiner

Primary Examiner—John Sipos
Assistant Examiner—Paul Durand
(74) Attorney, Agent, or Firm—William J. Sapone; Henry Coleman; R. Neil Sudol

(57) ABSTRACT

In a device for singling out items coming from a feeder, with the feeder comprising an outlet channel for conveying the items an end section, compacting air jets are placed along the outlet channel for gathering the items one behind the other according to a continuous row, at the end section. The device is equipped with and abutment and catching comb for singling out a series of single and successive leading items of the row of items at the end section, and a driving belt moves the abutment and catching comb according to a direction of extraction at the end section, for abutting and catching a series of single and successive leading items and for transferring and placing the series of singled out items at a handling station.

18 Claims, 5 Drawing Sheets

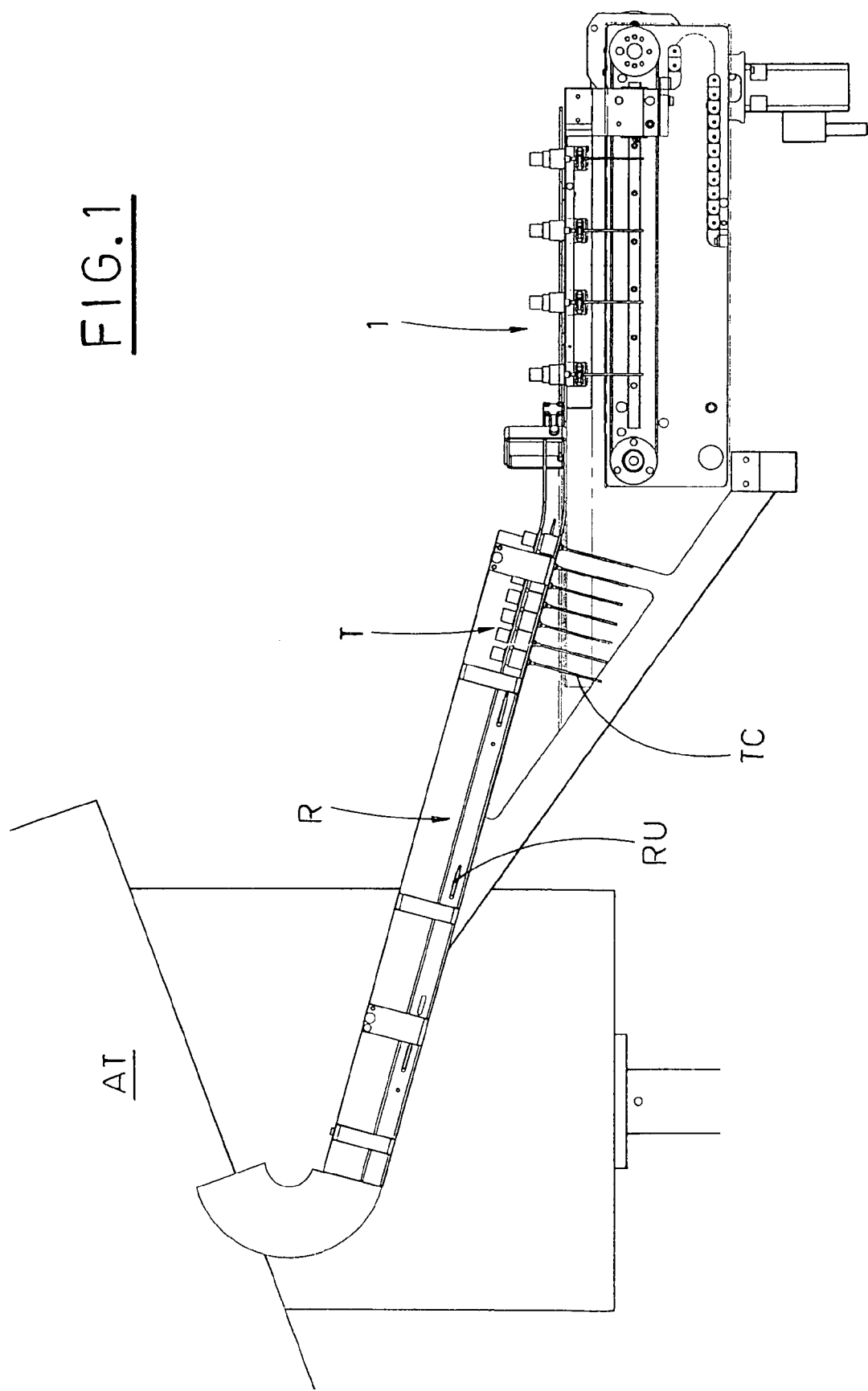

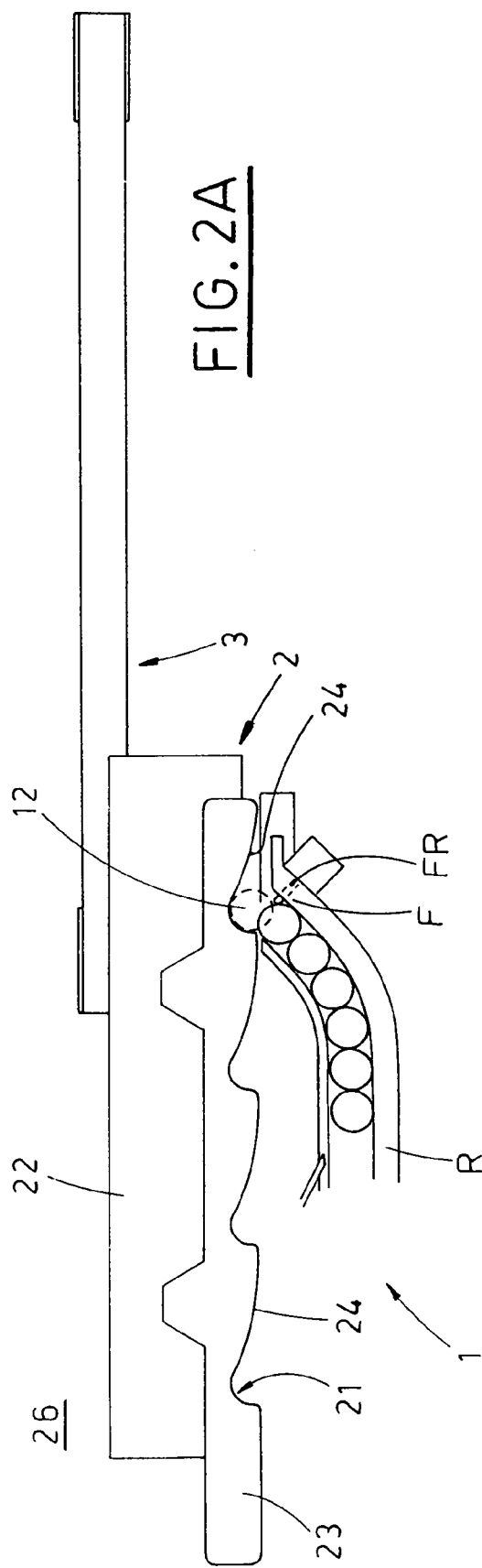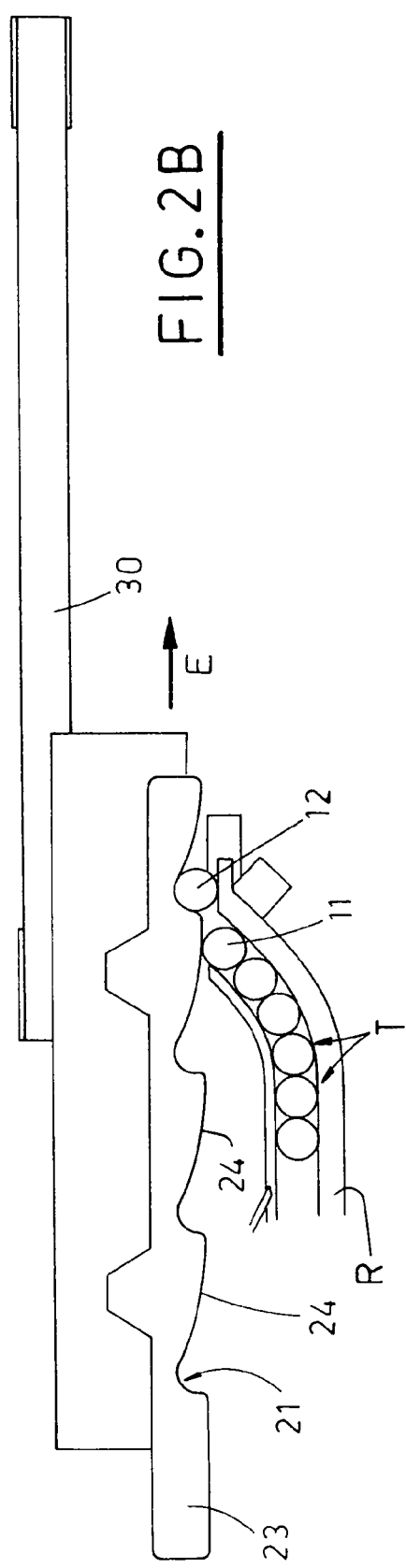

DEVICE FOR SINGLING OUT ITEMS COMING FROM A FEEDER

FIELD OF THE INVENTION

The present invention relates to equipments that automatically or semi-automatically fills vessels, containers and/or bottles with products, closes them by the application of at least one stopper of a type suitable for the type of contents, and then packages them into a corresponding and appropriate package.

More in detail, the present invention relates to a device capable of singling out items coming from a feeder, which is specifically located between a bottle filling station and a bottle closing station by relevant stoppers, for example the type of stoppers (atomisers) that regulate the delivery and supply of the liquid or fluid product contained within the said bottles.

DESCRIPTION OF THE PRIOR ART

Stoppers (atomisers) that regulate the delivery and supply of a liquid or fluid product are often used to close bottles containing such product.

These stoppers are provided with a tube that in the coupling stage must be introduced into the bottle body. Typically, the tube is obtained by cutting a piece of plastic pipe unwound from a reel. Therefore, the tube has generally a curved shape, especially when the plastic pipe is withdrawn from the inner part of the reel. This fact can cause problems when the tube is to be introduced automatically into the narrow opening of the bottle.

In equipment of known type, the atomisers stored in a feeder are conveyed by the latter, arranged in a row and according to the same orientation, for example with the tube facing downwards, by a routing channel towards the bottle conveying line at an operating station that carries out the atomiser-bottle coupling.

A problem currently found in known equipment consists in the capability of arranging a certain number of singled out and spaced stoppers (for example at the same distance from one another) at such station, in order to use robot handling units acting on the stoppers to apply them to the bottles.

SUMMARY OF THE INVENTION

Object of the present invention therefore is that of proposing a device capable of singling out items coming in a row from a feeder.

Another object of the present invention is that of proposing a device capable of singling out a group of items coming from a feeder and arranged according to a same orientation in a row, and of routing them at a robot handling station.

Yet a further object of the invention is that of proposing a device capable of singling out a group of items coming from a feeder, setting said items at a distance from one another, and of routing them at a robot handling station while placing them at a side of respective packages or bottles with which the items are to be associated, the packages or bottles being conveyed to the handling station by a relevant conveying line.

A further object of the invention is that of proposing a device capable of singling out a group of items coming from a feeder and of spacing them out by distances corresponding to the distances among packages or bottles arranged along a related line, with which packages or bottles the items are to be associated.

It is also an object of the present invention that of proposing a device capable of singling out a group of items, in particular a group of stoppers, ad of spacing them out in accordance to distances corresponding to the distances among the necks of corresponding bottles arranged along a related conveying line.

Yet a further object of the present invention is that of proposing a device capable of disposing and positioning, with precision, the singled out items, in particular tube-provided stoppers, beside relevant bottles, with such order and configuration as to allow use of robot operated means to carry out the application operation, in particular the introduction of the tube into the relevant bottle.

The above mentioned objects are achieved in accordance with the independent claim, by a device for singling out items coming from a feeder, said feeder comprising an outlet channel for conveying said items towards a relevant end section, said device including:

compacting means placed along said outlet channel for gathering said items one behind the other according to a continuous row at said end section;

abutment and catching means of single items for abutting and catching a series of single and successive leading items of said row of items at said end section;

extracting and conveying means for driving said abutment and catching means to pass according to a direction of extraction at said end section for abutting and catching a series of single and successive leading items and for transferring and placing said series of singled out items at a handling station.

BRIEF DESCRIPTION OF THE DRAWINGS

The invention will now be described in more detail with reference to particular, non-limiting embodiments and with reference to the accompanying drawings, in which:

FIG. 1 shows a schematic side view of the device, which is the subject of the present invention, considered in its entirety;

FIGS. 2A, 2B and 2C show schematic plan views of particularly relevant components of the proposed device, as it appears during subsequent and separated singling out operation steps on a series of stoppers coming from a feeder, and during arranging the stoppers at a robot operated handling station, alongside of a bottles conveying line;

DESCRIPTION OF THE PREFERRED EMBODIMENTS

Figure 2C:
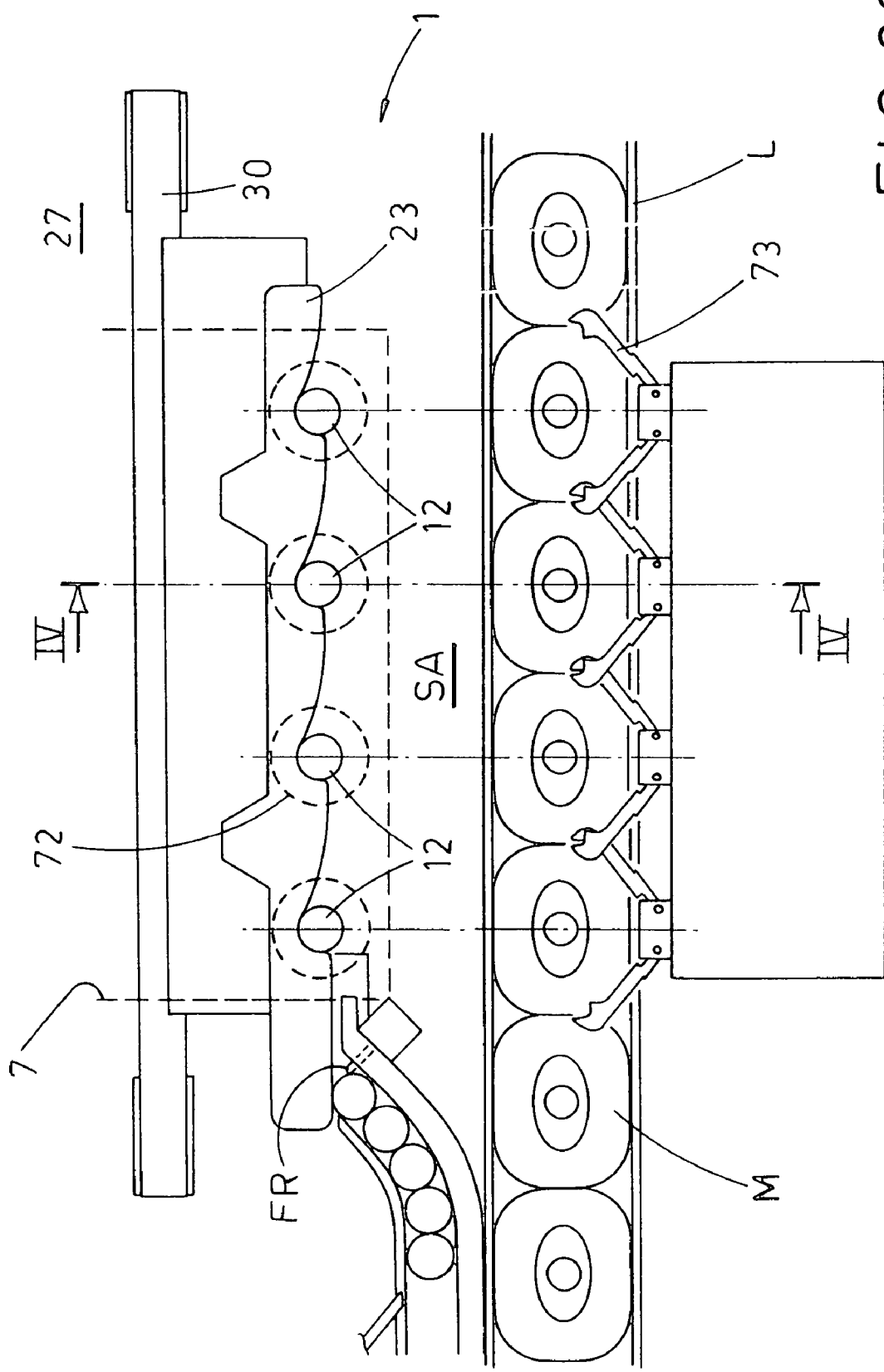

With reference to the attached drawings, reference numeral (1) globally denotes the device for singling out items (T) coming from a feeder (AT) object of the present invention.

The items mentioned (T), of any type and shape, in the illustrated example consist of stoppers intended to be coupled to corresponding containers (M) (vessels, bottles, etc.) arranged on a conveying line (L) of an automatic or semi-automatic equipment for filling such containers with a product or substance (for example a liquid or fluid product) therein.

In particular, such stoppers (T) are of the type for dispensing the substance contained in the relevant bottle, and known as atomisers, which are provided with a relevant tube (TC) which, in the coupling stage, must be introduced into the same bottle.

As usual, the tube is obtained by cutting a piece of plastic pipe unwound from a reel. Therefore, the tube has a curved shape, especially when the plastic pipe has been withdrawn from the inner part of the reel.

The aforementioned feeder (AT), as shown for example in FIG. 1, is provided with an outlet channel (R) along which the stoppers (T) are conveyed according to a same orientation, for example with the tube (TC) turned downwards.

To this purpose, the outlet channel (R) is inclined for conveying, by gravity, the stoppers contained therein towards the relevant end section (F), and is provided with compacting means (RU) that exert a further stress action on such stoppers for gathering them to one another according to a continuous row at said end section (F).

Said compacting means (RU) consist of a plurality of nozzles, arranged along the outlet channel (R) which from upstream to downstream, route compressed air jets on the stoppers as they are conveyed, by gravity, towards the end section (F) of the outlet (R): in this way, a further pressure stress is exerted in said end section on the stoppers present therein, by the incoming stoppers, which compacts them according to a continuous row.

At said end section (F) (reference, for example, shall be made to FIG. 2A) there are arranged stop means (FR), adapted for striking against the leading stopper (11) of the row of stoppers (T) so as to temporarily hold the latter into the same outlet.

The device (1) object of the present invention aims at realising the singling out of single and consecutive stoppers, extracting them from the end section (F) of the output channel (R), for example arranging them at the same distance from one another, and at conveying said equidistant stoppers at a special handling station, so as to allow the use of robot units for performing the coupling with the necks of the bottles placed on the aforementioned conveying line (L).

To this purpose, as illustrated in general in FIG. 2A, such device (1) is provided with abutment and catching means (2) for single stoppers (12) adapted for individually abutting and catching a series of single and successive leading stoppers (11) conveyed from the outlet channel (R) at the relevant end section (F) and released by the aforementioned stop means (FR), and extraction and conveying means, globally indicated with reference numeral (3) in the same FIG. 2A, adapted for allowing said abutment and catching means (2) to pass according to a direction of extraction (E) at said end section (F) for abutting and catching a series of single and successive leading items for transferring and placing said singled out items at a robot operated handling unit (SA).

According to the embodiment illustrated by way of an example in the figures, the aforementioned extraction and conveying means (3) consists of a reciprocating driving belt (30), for example arranged horizontally and as an endless belt, arranged in the proximity of the outlet channel (R) and facing the end section (F) of said channel (R) with a relevant longitudinal edge, and the aforementioned abutment and catching means (2) consist of a plate (22), firmly connected to the upper branch of said driving belt (30), which in the relevant longitudinal side facing said end section (F) is provided with a shaped comb (23).

Such shaped comb (23) has a series of recesses (21), spaced from one another (for example in the proposed figures these recesses are at the same distance from one another according to a fixed step, corresponding to the distance of the necks of successive containers (M) present on the conveying line (L) and exhibiting such shape as to receive in abutment and hold, with respect to the aforementioned direction of extraction (E), a respective single item (12), and it also features a series of catching ramps (24) each converging towards a relative recess of the aforementioned series of recesses (21).

Said catching ramps (24), following the passage of the comb (23) according to said direction of extraction (E) at the end section (F) of the channel (R), are adapted for individually and successively catching respective leading stoppers (11) conveyed by the same channel (R) towards the relevant end section (F) and released by the stop means (FR), and they accompany each of said singled out items (12) into a relevant recess (21).

As shown in detail in the operating sequences illustrated in succession in FIGS. 2A, 2B and 2C, the comb (23) is alternately moved by the driving belt (30) from a first retracted end position, indicated with the reference numeral (26) in FIG. 2A, wherein it is located upstream of the end section (F) of the channel (R) conveying the stoppers (T) with the relevant first catching ramp (24) of said series of ramps (24) facing said end section (F) ready to catch the leading stopper (11) released by the stop means (FR), to a second advanced end position according to the direction of extraction (E), indicated with the reference numeral (27) in FIG. 2C, at which the robot operated handling station (SA) mentioned above is placed.

Passing from its first retracted end position (26) to the second advanced end position (27), thanks to the series of ramps and recesses it is provided with, the comb (23) abuts and catches a series of single and successive stoppers (12) conveyed from the channel (R), thanks to its inclination and to the compressed air jets of the nozzles (RU), at the relevant end section (F) and released by the stop means (FR), and transfers and placed them at the robot operated handling station (SA).

The proposed device (1) is further provided (see FIG. 4) with means (40) for stabilising the stoppers (12) caught and singled out by the comb (23) during the transfer from the first retracted position (26) to the second advanced end position (27), in particular said stabilisation means (40) are specifically provided for keeping the tubes (TC) of the singled out stoppers (12) substantially vertical.

Figure 3:
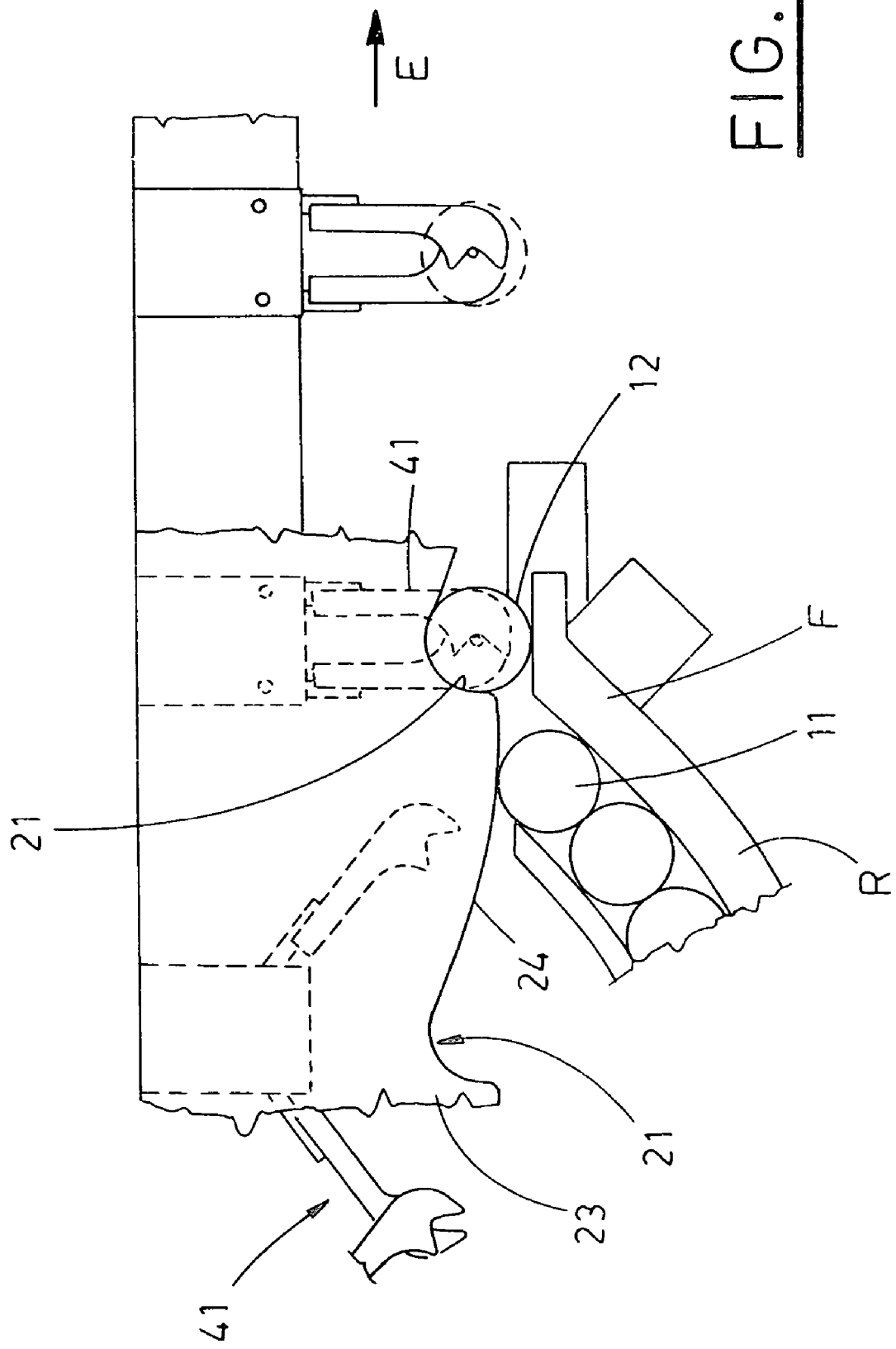
FIG. 3 shows, with an enlarged scale, a plan view of the device during a particularly important stopper singling out step.

As shown in the attached figures, said stabilisation means (40), according to a first possible embodiment, consist of a series of clamps (41) (see for example FIG. 3), each associated to the comb (23) below each recess of said series of recesses (21).

Each of said clamps (41) in phase relation at the passage according to said direction of extraction (E) of the relevant recess (21) at the end section (F) of the channel (R), is adapted for close for gripping the tube (TC) of the stopper caught by the recess (21) in order to stabilise the same stopper during the aforementioned transfer.

Figure 4:
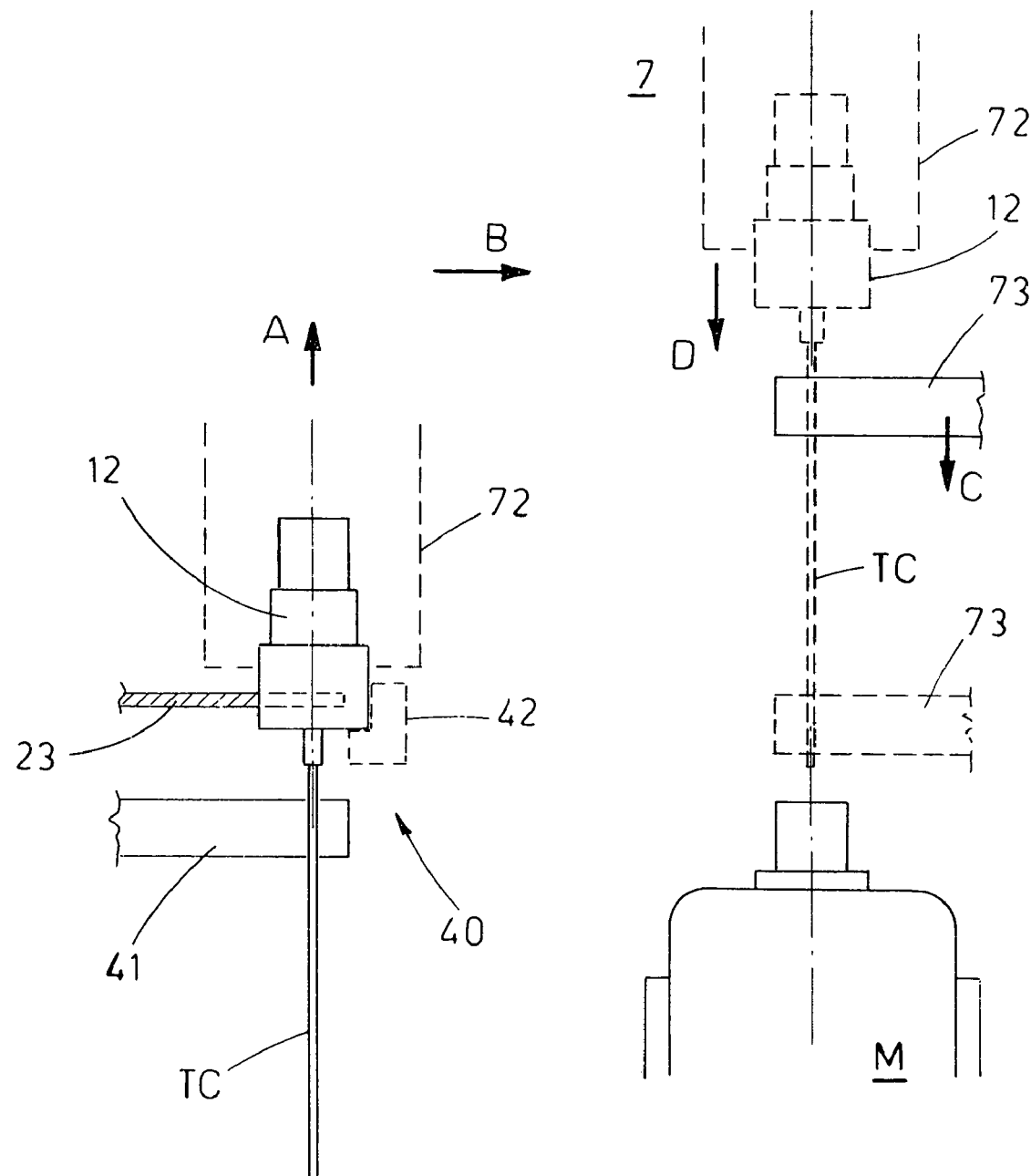
FIG. 4 shows a sectional view taken along line IV—IV of FIG. 2C and illustrates in detail operation steps in which a singled out stopper is applied to a bottle with particular reference to the introduction of the stopper tube into the bottle.

The same stabilisation means (40), according to a further possible embodiment indicated with dashed lines in FIG. 4, include a counter-guide (42) arranged counter-facing the same comb (23) at its path from the first retracted end position (26) to the second advanced end position (27) and adapted for holding and stabilising the singled out stoppers (12) between it and the recesses (21) of the comb (23), oriented with the relevant tubes (TC) facing downwards.

Such counter-guide (42) has an "L"-shaped transversal section for receiving in abutment the outside portion of the singled out stoppers (12) caught by the recesses (21) of the comb (23) and making it slide.

In the proposed example, also the conveying line (L) conveys the containers (M) placed thereon, in a row one behind the other, at the robot operated handling station (SA).

In particular, the driving belt (30) and the conveying line (L) are actuated in reciprocal phase relation so as to place, as illustrated in detail in FIG. 2C, at the robot handling station (SA), respectively the singled out stoppers (12) facing the relevant containers (M).

In the proposed example, the driving belt (30) moves the comb (23) so as to place a series of four singled out stoppers (12), at the same distance from one another, at the handling station (SA), whereas the conveying line (L) places at the same station (SA) a series of four containers (M) arranged in a row, one behind the other.

Said reciprocal configuration, between the series of four singled out stoppers and the relevant series of four bottles, advantageously allows the use of a robot unit (7) in the handling station (SA) (see FIG. 4) which can independently and quickly and accurately perform the operations of: collecting (A) the singled out stoppers in phase relation upon the release of the latter by the relevant stabilisation clamps (41), transferring (B) the latter on top of the containers (M) located on the conveying line (L), and coupling (C, D) the stoppers to the containers (M) with relevant insertion of the tube into the same containers.

To this purpose the robot unit (7) is provided with special pick up means (72), supported and moved by a relevant operating head. The pick up means are provided in a number at least corresponding to the series of stoppers singled out and transferred by the comb (23) at the handling station (SA).

In phase relation with the comb (23) reaching the second advanced end position (27), the stop means (FR) are actuated (FIG. 2C) for temporarily holding the stoppers (T) into the channel (R) and allowing the same comb (23) to be repositioned, after the robot unit (7) has picked up the series of singled out stoppers (12), in the first retracted end position (26).

As shown in FIG. 4, the same robot unit (7) is also provided with special clamp means (73) vertically moving on top of the series of containers (M), placed by the conveying line (L) at the handling station (SA), specifically provided for straightening the tubes (TC) before they are inserted into the containers (M) and for cooperating with the aforementioned collecting means (72) during the coupling of the stoppers to the containers (M).

Said clamp means (73) enclose the tubes (TC) at the relevant top portion, in the proximity of the stopper body, in phase relation with the transfer of the singled out stoppers by the pick up means (72) on top of the containers (M).

The same clamp means (73), in phase advance with the lowering of the pick up means (72), keeping the abutment on the tubes (TC) slide vertically downwards ending their stroke at the lower portion of the latter (said movement is indicated with the reference (C) in FIG. 4, with the initial position of the clamp means (73) highlighted with solid line, whereas the end position of the latter is indicated with dashed line): in this way, they perform an advantageous straightening of the tubes before they are inserted into the containers.

Moreover, the clamp means (73) guide the relevant tubes (TC) during the lowering (D) of the collecting means (72) for facilitating the insertion of the same into the container, since they keep the same tubes centred relative to the inlet of the container, whereas they open with suitable phase advance when the body of the stopper arrives at said inlet for allowing the collecting means to complete the stopper-container coupling.

From what described above it is clear that the device object of the present invention, in an effective and functional manner, allows singling out of a series of stoppers by extracting them from the outlet channel of a feeder, and routing and placing the latter, in line, at a handling station wherein a robot operated unit can be used that, in a very quick and reliable way, applies said stoppers to relevant bottles placed on a relevant conveying line.

In this way, the stopper-bottle coupling is independent, advantageously compared to the equipment of the prior art, of the methods of actuation of the same bottle conveying line.

In particular, the proposed device is particularly advantageous in the case of singling out of stoppers of the atomiser type, provided with a relevant tube: in fact, the device object of the present invention allows performing the singling out of said stoppers by extracting them from a relevant conveying channel, and keeping the singled out stoppers in a steady orientation, with the tube facing downwards, during their transfer towards the handling station.

Moreover, the fact of singling out the stoppers arranging them at the same distance from one another at said handling station allows the use of robot units provided with special clamp means that advantageously before the insertion of the stopper into the container, realise a straightening of the relevant tube.

It should be noted that the proposed device is realised by a reliable and functional technique in any operating condition, and moreover with a limited number of elements and at a low cost.

What is claimed is:

1. A device for singling out items, the items delivered from a feeder which conveys said items to an outlet channel and towards an end section, said device comprising:

compacting means placed along said outlet channel for gathering said items one behind the other in a continuous row at said end section;

abutment and catching means for abutting and catching a series of single items and each successive leading item of said row of items at said end section;

extracting and conveying means for driving said abutment and catching means, and for passing said items in a direction of extraction at said end section and transferring and placing said series of singled out items at a handling station;

said extracting and conveying means including a reciprocating driving belt situated close to said outlet channel, facing said end section of the outlet channel;

said abutment and catching means including a plate carried by said driving belt, and a comb connected to said plate, on a longitudinal side facing said end section;

a series of recesses made in said comb and spaced from one another, said recesses having a shape for receiving in abutment and for holding, with respect to the direction of extraction, a respective single item; and, a series of catching ramps made in said comb and converging towards each recess of the series of recesses, said catching ramps, following passage of the comb in said direction of extraction at the end section of the channel, adapted for individually and successively catching respective leading items conveyed by said outlet channel towards said end section and released by the abutment means, and for accompanying each of said singled out items into a respective recess.

2. The device according to claim 1, wherein said comb is alternately moved by the driving belt from a first retracted end position located upstream of the outlet channel end section with a first catching ramp to a second end position advanced from the first position in the direction of extraction, a robot operated handling station located at the second position, the shift of said comb from said first refracted end position to said second advanced end position extracting and catching, using said ramps and recesses, a series of single and successive items from said outlet channel, and transferring and placing said items at said robot operated handling station.

3. The device according to claim 2 further comprising stabilising means associated with said comb for keeping said singled out items firmly oriented and housed within said recesses during transferring from said first retracted end position to the second advanced end position.

4. The device according to claim 1 wherein said outlet channel is inclined to ease conveyance of said items towards said end section due to gravity.

5. The device according to claim 1 wherein said compacting means include a plurality of nozzles for directing compressed air jets on the items from an upstream direction to a downstream direction towards the end section as the items are conveyed towards said end section.

6. The device according to claim 1 further comprising stop means at said end section for striking a leading item of the row of items and temporarily holding said items in said outlet channel, and for releasing said items in phase relation with passage of said abutment and catching means through said end section.

7. The device according to claim 1 wherein said comb has a series of recesses spaced from one another by a fixed amount, the comb receiving said items in abutment and holding respective and subsequent leading items for singling out items and placing the singled out items at regular distances from one another.

8. The device according to claim 1 wherein said driving belt is an endless belt oriented horizontally and having an upper operative branch supporting said plate.

9. The device according to claim 1 further comprising a conveying line for conveying containers with which said singled out items are to be associated, said conveying line transferring said containers to the handling station, said driving belt arranged beside the conveying line.

10. The device according to claim 9 wherein at said handling station, said comb sets out said series of items, singled out and spaced out by said comb in correspondence to a series of containers conveyed by said conveying line to said handling station.

11. The device according to claim 9 further comprising a robot operated unit situated at said handling station for picking up said series of singled out items from said recesses of said comb and for transferring said series of singled out items to said conveying line, for associating said singled out items with said series of containers.

12. The device according to claim 11 wherein said robot operated unit includes an operating head for supporting and moving a plurality of pick up means provided in a number at least corresponding to said series of items transferred by said comb to said handling station.

13. The device according to claim 1 wherein said items are stoppers for dispensing metered quantities of products contained into said container to which said stoppers are to be added, each stopper having a tube which is to be introduced into and situated within said containers, said device further comprising stabilising means associated to said comb for stabilizing and keeping a series of said singled out stoppers caught by said ramps and held by said recesses oriented with the tubes substantially vertical during transferring of said comb from said first retracted end position to the second advanced end position at said handling station.

14. The device according to claim 13 wherein said stabilizing means include a series of clamps, each clamp of said series of clamps being operatively associated to said comb, below a corresponding recess of said series of recesses, each clamp gripping a tube of a stopper caught by a corresponding recess, in phase relation with the passage of the recess at the end section of said outlet channel so as to stabilise the caught stopper during passage.

15. The device according to claim 13 wherein said stabilizing means include a counter-guide arranged counter-facing the comb in a path leading from the first retracted end position to the second advanced end position, said counter-guide holding the singled out items gripped between the counter-guide and the recesses of the comb during transfer to said handling station.

16. The device according to claim 15 wherein said counter-guide has an L-shaped cross-section for receiving an outer portion of said stoppers caught by said comb.

17. The device according to claim 13 further comprising a container conveying line for conveying a series of containers to which the spaced out stoppers caught by said comb at said handling station are to be applied, and, a robot operated unit located at said handling station for picking up said series of stoppers, and raising said series of stoppers to release the tubes from said stabilizing means, for transferring said series of stoppers to a position above said series of containers, lowering said series of stoppers to introduce completely said tubes into said containers and to complete application of said stoppers to said containers.

18. The device according to claim 17 wherein said robot operated unit has an operating head for supporting and moving a plurality of pick up means present in a number at least corresponding to the series of said stoppers singled out and transferred by said comb at the handling station, a series of clamp means vertically moving on top of the series of containers, arranged along said conveying line, said clamp means for encircling the tubes of said stoppers at their upper portion, in phase relation with a transferring of said stoppers to a position above said containers carried out by pick up means, and for sliding downwards along said tubes toward a bottom portion of said tubes, for straightening the tubes just before said pick up means are lowered, and for guiding the tubes, when said pick up means are lowered, to facilitate introduction of the tubes into said containers, said clamp means releasing said tubes to allow said pick up means to complete application of the stoppers to said containers.

* * * * *